No. 681,787. Patented Sept. 3, 1901.
C. C. HARTUNG.
APPARATUS FOR MAKING CORRUGATED GLASS.
(Application filed Oct. 24, 1900.)
(No Model.) 2 Sheets—Sheet 1.
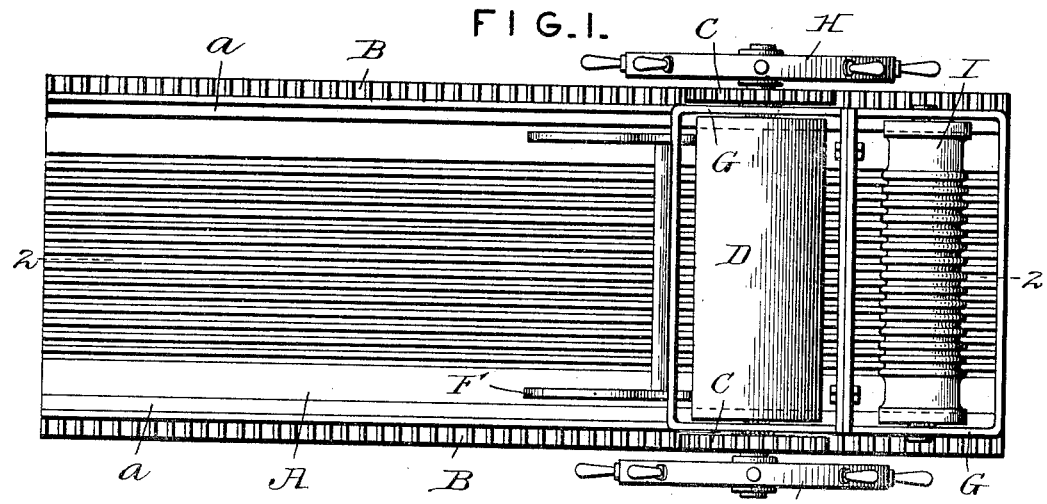
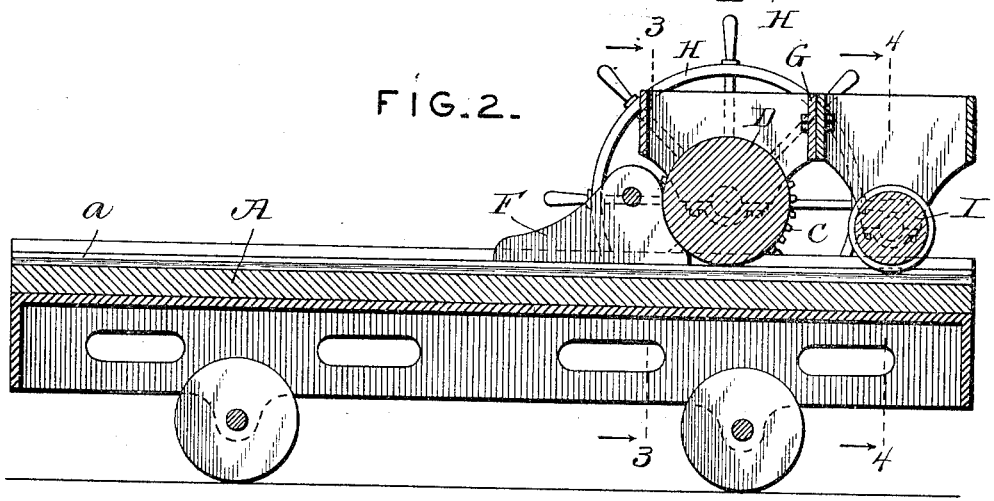
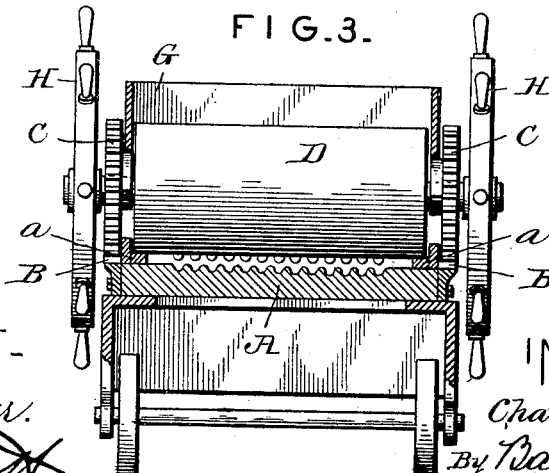
ATTEST-
Harry L. Amer.
Wm H Scott
INVENTOR-
Charles C. Hartung
By Bakewell & Cornwall
Atty's No. 681,787. Patented Sept. 3, 1901.
C. C. HARTUNG.
APPARATUS FOR MAKING CORRUGATED GLASS.
(Application filed Oct. 24, 1900.)
(No Model.) 2 Sheets—Sheet 2.
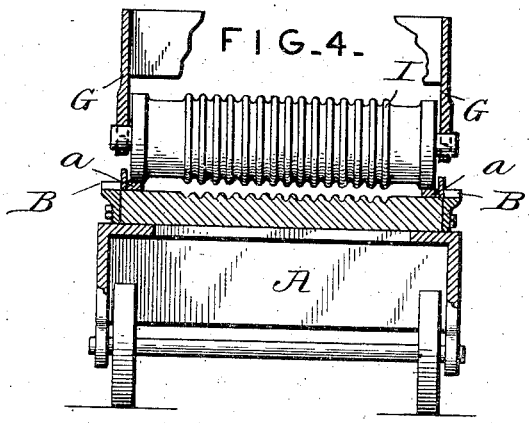
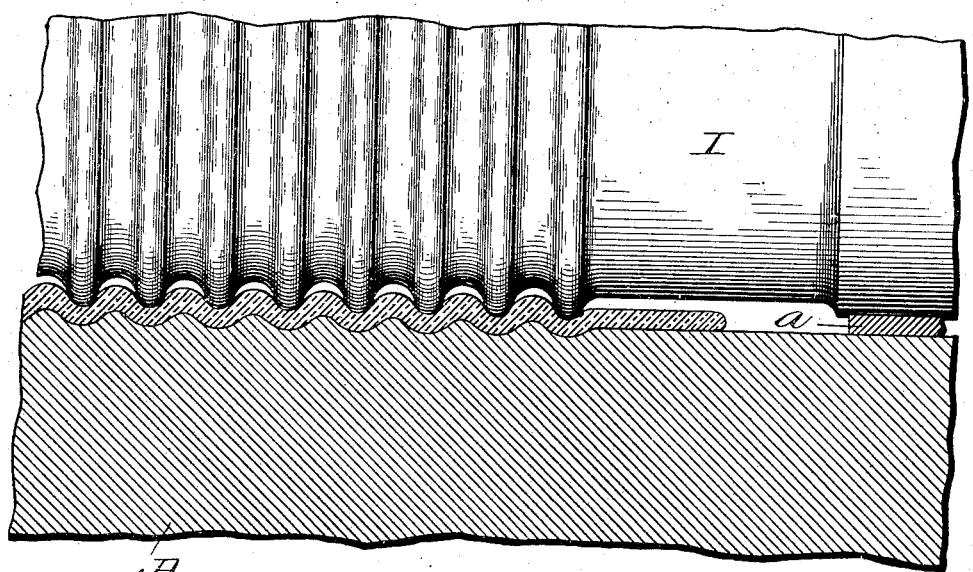
ATTEST- INVENTOR-
Charles C. Hartung.
By Bakewell & Cornwall
Atty's.

UNITED STATES PATENT OFFICE.

CHARLES C. HARTUNG, OF ST. LOUIS, MISSOURI, ASSIGNOR TO EDWARD WALSH, JR., OF SAME PLACE.

APPARATUS FOR MAKING CORRUGATED GLASS.

SPECIFICATION forming part of Letters Patent No. 681,787, dated September 3, 1901.

Application filed October 24, 1900. Serial No. 34,225. (No model.)

*To all whom it may concern:*

Be it known that I, CHARLES C. HARTUNG, a citizen of the United States, residing at the city of St. Louis, State of Missouri, have invented a certain new and useful Improvement in Apparatus for Making Corrugated Glass, of which the following is a full, clear, and exact description, such as will enable others skilled in the art to which it appertains to make and use the same, reference being had to the accompanying drawings, forming part of this specification.

This invention relates to a new and useful improvement in the manufacture of sheet-glass of that type commercially known as "corrugated," the invention being particularly designed for use in connection with the manufacture of double-corrugated glass—that is, glass wherein both sides are corrugated.

The object of the invention is to corrugate the upper or rolled surface of the glass in such manner as to dispense with the irregularities and cracks which appear in glass made with a corrugated roller, wherein the depths of the corrugations on the roller are coincident with the corrugations formed on the glass—such as illustrated in the patent granted to Edward Walsh, Jr., December 13, 1892, No. 487,803.

In practicing the invention according to the construction shown and described in said Patent No. 487,803, wherein the roller is corrugated conversely to the corrugations appearing on the resultant sheet of glass, there is such a difference in the circumferential speed on the convex portions of the corrugations of the roller and the concave portions thereof that the surface of the glass is disturbed, and if sufficiently hot to be fluid ridges or lumps will be formed, and if the surface of the glass is chilled the convex portions of the roller in pressing the glass down will skin-draw the glass, so that the corrugations in the sheet of glass will crack transversely. By my present invention I obviate these objections and produce a sheet of double-corrugated glass free from flaws, such as above described.

My invention consists, generally stated, in a corrugating-roller, preferably following a plain roller, the space between the corrugations on said roller being deeper or larger than the resultant corrugation on the sheet of glass, so that the point of contact of the roller with the glass is only along the convex portions of the corrugations thereof.

In practicing my present invention I prefer that the glass shall be sufficiently hot to slightly flow after the passage of the corrugating-roller, whereby inequalities will be corrected by the molten glass itself.

Other features of my invention reside in the novel arrangement, construction, and combination of the several parts, all as will hereinafter be described, and afterward pointed out in the claims.

In the drawings, Figure 1 is a plan view of a glass-rolling machine. Fig. 2 is a vertical sectional view on line 2 2, Fig. 1. Fig. 3 is a vertical sectional view on line 3 3, Fig. 2. Fig. 4 is a sectional view on line 4 4, Fig. 2. Fig. 5 is a detail view, full size, illustrating the operation of the corrugated roller, and Fig. 6 is a cross-sectional view through a sheet of corrugated glass.

In the drawings, A indicates a table, preferably corrugated longitudinally, on each side of which are arranged spacing-strips $a$, upon which the rollers rest, said spacing-strips regulating the thickness of the sheet of glass.

B indicates the racks on each side of the table, with which mesh gears C, conjoined to the main roller D. This "main roller," as I have called it, is a smooth-surfaced roller resting upon the strips $a$, in front of which in the operation of the machine molten glass is placed, the usual running-frame F being employed in advance thereof to define the width of the sheet of glass.

H indicates the hand-wheels conjoined to the plain roller, by which the same may be manually operated to traverse the table. If desired, however, a motor may be employed in connection with the roller, as is well understood.

G indicates the carriage embracing the ends of the plain roller, said carriage having mounted in its rear end the corrugated roller I. This corrugated roller is preferably provided with plain ends designed to rest upon the strips a, while the middle portion thereof is corrugated, as shown in Fig. 5, wherein it will be seen that the projecting portions of the corrugations register with the grooves of the table, while the spaces between the projecting portions of the corrugations are deepened so as not to contact with the molten glass being operated upon.

In operation the molten glass, being placed in advance of the plain roller will be spread over the table, thereby filling the corrugations of the table-bed and producing a sheet of glass having one surface, the under, corrugated by the table. The following corrugated roller I operates upon the upper or plain surface of the sheet of molten glass, its projecting portions of the corrugations embedding themselves in said plain surface of the molten glass and dislodging the molten glass, forcing it up into (but not filling) the spaces between the projecting portions of the roller corrugations. After the corrugated roller I has passed over the glass I prefer that the glass shall be sufficiently molten to slightly flow for the purpose of effacing the lines of contact of the corrugations of roller I therewith.

I am aware that minor changes in the arrangement, construction, and combination of the several parts of my device can be made and substituted for those herein shown and described without in the least departing from the nature and principle of my invention.

Having thus described my invention, what I claim, and desire to secure by Letters Patent, is—

1. A roller for corrugating glass, the same having deep spaces between the projecting portions of the corrugations so that the bottom walls of said spaces will not contact with the glass; substantially as described.

2. A roller for corrugating glass, the same having plain bearing ends and a corrugated intermediate portion, the corrugations thereof having deep spaces between them so that the bottom walls of said spaces will not contact with the glass being operated upon; substantially as described.

3. In an apparatus of the character described, the combination with a corrugated table, strips on said table to determine the thickness of the glass to be rolled, a plain roller for spreading the glass over the corrugated portion of the table and a corrugated roller following in the wake of the plain roller, said corrugated roller having plain bearing ends, a reduced space adjacent said bearing ends, the projecting portions of the corrugations registering with the corrugations of the corrugated table, and the spaces between said projecting portions of the corrugations being deep so that the bottom walls of said spaces will not contact with the glass, substantially as described.

4. The combination with a corrugated table, of strips a arranged thereon, a plain roller mounted upon said strips for spreading molten glass over the table, a frame, and a corrugated roller mounted in said frame, and to the rear of the plain roller, said corrugated roller having deep spaces between the projecting portions of its corrugations so as to prevent contact of the molten glass with the bottom walls of said spaces; substantially as described.

5. The combination with a longitudinally-corrugated table, of a plain roller for spreading the molten glass thereover, a following roller having corrugations whose convexed portions register with the concaved portions of the table corrugations, the spaces between the projecting portions of the corrugations on said roller being deep, whereby, molten glass being rolled cannot contact with the bottom walls of said spaces; substantially as described.

In testimony whereof I hereunto affix my signature, in the presence of two witnesses, this 3d day of October, 1900.

CHARLES C. HARTUNG.

Witnesses:
F. R. CORNWALL,
WM. H. SCOTT.